(12) United States Patent
Katsaros et al.

(10) Patent No.: US 9,546,723 B2
(45) Date of Patent: Jan. 17, 2017

(54) BEVEL GEAR HOUSING, BEVEL GEAR AND METHOD OF ASSEMBLING THE SAME

(71) Applicants: Padelis Katsaros, Schweinfurt (DE); Volker Wendt, Uechtelhausen/Zell (DE)

(72) Inventors: Padelis Katsaros, Schweinfurt (DE); Volker Wendt, Uechtelhausen/Zell (DE)

(73) Assignee: AKTIEBOLAGET SKF, Gothenburg (SE)

(*) Notice: Subject to any disclaimer, the term of this patent is extended or adjusted under 35 U.S.C. 154(b) by 44 days.

(21) Appl. No.: 14/568,843

(22) Filed: Dec. 12, 2014

(65) Prior Publication Data

US 2015/0176689 A1 Jun. 25, 2015

(30) Foreign Application Priority Data

Dec. 19, 2013 (DE) ........................ 10 2013 226 752

(51) Int. Cl.
*F16H 48/42* (2012.01)
*F16H 57/02* (2012.01)
*F16H 48/08* (2006.01)

(52) U.S. Cl.
CPC .............. *F16H 48/42* (2013.01); *F16H 57/02* (2013.01); *F16H 48/08* (2013.01); *F16H 2048/423* (2013.01); *F16H 2048/426* (2013.01); *Y10T 29/49696* (2015.01)

(58) Field of Classification Search
CPC .......... F16H 48/08; F16H 48/42; F16H 57/02; F16H 2048/426; F16H 2048/423; Y10T 29/49696

USPC ................................ 475/220, 230; 74/606 R
See application file for complete search history.

(56) References Cited

U.S. PATENT DOCUMENTS

| 4,004,472 | A | 1/1977 | Millward et al. | |
|---|---|---|---|---|
| 5,289,635 | A * | 3/1994 | Martin | B23P 19/04 29/446 |
| 7,090,609 | B2 * | 8/2006 | Ziech | F16C 19/56 475/220 |
| 7,500,934 | B2 * | 3/2009 | Ziech | B60K 17/36 475/221 |
| 2003/0083171 | A1 | 5/2003 | Turner et al. | |
| 2003/0186774 | A1 * | 10/2003 | Sullivan | F16C 19/56 475/230 |
| 2004/0259676 | A1 * | 12/2004 | Turner | F16C 19/548 475/246 |
| 2005/0245342 | A1 * | 11/2005 | Pontanari | F16H 48/08 475/230 |

FOREIGN PATENT DOCUMENTS

| DE | 19925353 C1 | 3/2000 | | |
|---|---|---|---|---|
| NL | EP 0427333 A1 * | 5/1991 | ............. | B60K 17/16 |

* cited by examiner

*Primary Examiner* — Roger Pang
(74) *Attorney, Agent, or Firm* — Bryan Peckjian; SKF USA Inc. Patent Dept.

(57) ABSTRACT

A housing for a bevel gear includes a pinion bearing seat configured to support a pinion bearing for a driveshaft having a drive pinion. The housing also includes an attachment structure configured to attach a support bearing seat to the housing such that the position of the support bearing seat with respect to the pinion bearing seat is variable in the radial direction.

17 Claims, 2 Drawing Sheets

BEVEL GEAR HOUSING, BEVEL GEAR AND METHOD OF ASSEMBLING THE SAME

CROSS-REFERENCE TO RELATED APPLICATION

This application claims priority to German patent application no. 10 2013 226 752.5 filed on Dec. 19, 2013, the contents of which are fully incorporated herein by reference.

TECHNICAL FIELD

Exemplary embodiments relate to a housing for a bevel gear, to a bevel gear, and to a method for assembling a bevel gear.

BACKGROUND

Bevel gears are used in different applications for redirecting driving forces. An example of a bevel gear is a differential. In many vehicles, differentials, e.g., are used as bevel gears. Large forces often act on differentials, which can be the case especially with differentials for heavy vehicles (e.g. trucks). These large forces can occur in particular in a pinion bearing for supporting the driveshaft. The driveshaft drives a drive pinion which drives a ring gear of the differential. Using the ring gear, output shafts can be driven via further transmission elements. In many conventional differentials a support bearing is used on one axial shaft end in order to support the large forces in the pinion bearing. Thus in some differentials the problem arises that the supporting of the driveshaft is overdetermined. The pinion bearing often comprises an assembly of two main bearings which mutually support each other. The pinion bearing itself is statically determinate. For example, the pinion bearing can comprise two tapered bearings in an O-arrangement. It can also be that the two main bearings of the pinion shaft or driveshaft determine the axis of rotation of the driveshaft. The support bearing can be installed in the housing such that it is not aligned with this axis of rotation, for example, due to manufacturing errors. As a result, forces can arise in the support bearing and in the pinion bearing.

Therefore in some conventional differentials an increased bearing clearance is provided for the support bearing. In some applications this bearing clearance can largely eliminate the alignment problem and the occurrence of constraining forces. However, in some circumstances, the providing of an increased bearing clearance in the support bearing can also lead to a loading of only some rolling elements. But, in some cases this situation of an unequal load distribution can easily lead to an overloading of the support bearing. For example, a premature wear of the rolling elements or of the raceways can occur. This effect is undesirable and may lead to increased maintenance costs of the transmission. In other conventional bevel gear bearings, similar forces can arise in the pinion bearing.

SUMMARY

Therefore a need exists to improve a compromise between the use of a support bearing on a shaft end for unloading a pinion bearing and the occurrence of constraining forces that can arise in a bevel gear due to the overdetermination of the supporting of a driveshaft.

Exemplary embodiments relate to a housing for a bevel gear. The bevel gear includes a pinion bearing seat. The pinion bearing seat is configured to support a pinion bearing for a driveshaft of a drive pinion. Furthermore, the housing also comprises an attachment structure. This attachment structure is configured to attach a support bearing seat to the housing. Here the support bearing seat is attached to the housing such that a position of the support bearing seat with respect to the pinion bearing seat is variable in the radial direction.

Since the housing has an attachment structure, via which a position of the support bearing seat with respect to the pinion bearing seat is variable in the radial direction, in some exemplary embodiments it can be made possible that the position of the support bearing seat can be adapted to an orientation of the driveshaft. In some exemplary embodiments the pinion bearing seat specifies the axial orientation of the driveshaft. The occurrence of constraining forces, which inevitably occur in the overdetermined supporting by the pinion bearing and the support bearing, can be minimized by the alignment of the support bearing seat with the pinion bearing seat. This could be made possible since a support bearing seat can be better aligned with respect to an axis of rotation of the driveshaft or to the pinion bearing. Constraining forces could still thereby occur, but to a lesser extent, since a more precise adjusting or arranging of the support bearing with respect to the already-oriented driveshaft is possible. Thus in some exemplary embodiments a support bearing having a small bearing clearance can be selected. This could lead to the service life of the support bearing being extended. This is possible because more rolling elements are now used for supporting the forces due to the more precise positioning and the smaller bearing clearance. As a result, the support bearing can generally support larger forces. In some exemplary embodiments this can even bring about that the forces, which act on the pinion bearing, can be reduced. This is possible since a greater portion of the forces can be supported by the support bearing.

Here a pinion bearing can be, for example, any type of main bearing that rotatably supports and orients a driveshaft. The pinion bearing can be, for example, a bearing assembly that is itself statically determinate. For example, the pinion bearing can be a bearing combination made of two rolling-element bearings. These can be preloaded against each other. In some circumstances, two tapered roller bearings, which are disposed in an O-arrangement with respect to each other, can be used as the pinion bearing.

In some further exemplary embodiments the housing comprises the variable support bearing seat. This is configured to support a support bearing for the driveshaft on one axial end of the driveshaft. In some exemplary embodiments it can thus be made possible that a support bearing seat, in which the support bearing is supported, is positionable with respect to the housing in a simple manner. The term "variable" can mean that a position of the support bearing seat with respect to the pinion bearing seat can be changed and then optionally releasably fixed. For example, the terms "variable" and "adjustable" can be used as synonyms in the following. A position that is variable or adjustable in the radial direction can be changed here, for example, in the radial direction by at least 0.05%, 0.1%, 0.2%, 0.3%, 0.4%, 0.5%, 0.6%, 0.7%, 0.8%, 0.9%, 1%, 1.2%, 1.5%, 2%, 2.5%, 3%, 3.5%, 4%, 4.5%, 5%, 5.5%, 6%, 6.5%, 7%, 8%, 9%, or 10% of an outer diameter of the support bearing. The support bearing seat can be fixed, for example, at at least two, three, four, or more positions which are spaced from one another in the radial direction by at least one of the above-mentioned values.

In some exemplary embodiments the support bearing supports the driveshaft in a region that lies between a free end of the shaft and the drive pinion. For this purpose the pinion bearing can be disposed on a side of the drive pinion facing away from the support bearing in the axial direction. An unloading of the pinion bearing can thus be made possible in a simple manner. In some exemplary embodiments the support bearing is used to reduce a bowing of the driveshaft. Furthermore, a force that acts on the pinion bearing could be reduced. For example, a cylindrical roller bearing can be used as the support bearing.

In some further exemplary embodiments the attachment structure is configured in order to adjust a position of the support bearing seat in the axial direction with respect to the pinion bearing seat. Thus in some cases it can optionally be made possible that the support bearing seat or the support bearing can also be positioned in the axial direction with respect to the orientation of the shaft. This can be desirable in exemplary embodiments, for example, if the support bearing is positioned on the shaft using a shoulder formed on the shaft. The position can be varied in the axial direction by a value which corresponds, for example, to at least 0.05%, 0.1%, 0.2%, 0.3%, 0.4%, 0.5%, 0.6%, 0.7%, 0.8%, 0.9%, 1%, 1.2%, 1.5%, 2%, 2.5%, 3%, 3.5%, 4%, 4.5%, 5%, 5.5%, 6%, 6.5%, 7%, 8%, 9%, or 10% of an outer diameter of the support bearing.

In some further exemplary embodiments the attachment structure is configured in order to vary an angle between the support bearing seat and the pinion bearing seat. Here the angle is formed by an axial direction of the support bearing seat and an axial direction of the pinion bearing seat. In this way, for example, a skewing of the bearing seat on the shaft or a skewing of the pinion bearing seat in the housing and/or even a bowing of the shaft can be at least partially compensated.

In some further exemplary embodiments the housing comprises a bearing shield. The bearing shield can include the support bearing seat. The attachment structure can attach the bearing shield to the housing. Thus in some exemplary embodiments having the bearing shield, an easy-to-install component can be provided. This component includes the support bearing seat. The bearing shield can be a component that is completely separable from the housing. For example, the bearing shield can also be formed as a flange. It could thus be made possible that the support bearing, or at least the outer ring of the support bearing, is installed in the bearing shield independent of or outside the housing. Assembly could thereby be simplified. In some exemplary embodiments, for aligning the support bearing with respect to the driveshaft, only the bearing shield could then be attached to the shaft and then attached to the housing such that no preload or only a smallest-possible preload arises with respect to the pinion bearing seat.

In some further exemplary embodiments, the bearing shield comprises a counter-attachment structure. The counter-attachment structure is configured in order to adjustably attach the bearing shield to the housing using the attachment structure. It could thus be made possible, for example, that the bearing shield can be attached to the housing in a manner corresponding to the position specified by the prepositioning of the driveshaft. Here the position of the bearing shield in the housing should be chosen such that the bearing seat in the bearing shield is aligned with the driveshaft. For example, the attachment structure can be a slot, a clamping device, a rail, a locking device, or similar. Accordingly the counter-attachment structure can be a screw which engages in the slot, a pin, a clamping bolt, or similar. Alternatively the counter-attachment structure can also be configured as a slot, a clamping device, a rail, a locking device, or similar.

In some further exemplary embodiments the bearing shield is disposed in a radially inner-lying region of the housing. It can thus be made possible in some exemplary embodiments that an outer shape of the housing is not influenced. Installation space can thus be saved in some circumstances. For example, the bearing shield can be disposed in a region of the housing wherein the housing itself includes an attachment flange. The attachment flange can serve, for example, for attaching the housing to a further unit. A manufacturing of the housing could thus be simplified. Furthermore, an advantageous force flow could thus be made possible in the housing. For example, the bearing shield can be disposed at a distance to the attachment flange of the housing, which distance corresponds to the width of the bearing shield.

In some further exemplary embodiments the bearing shield has a guide surface. The guide surface is configured in order to abut on a bearing shield contact surface of the housing. This can be the case, for example, if the bearing shield is fixed in the housing. In some exemplary embodiments the guide surface can make possible a guiding of the bearing shield in an axial direction with respect to the housing. For example, the bearing shield can include a carriage. Furthermore, the housing or the bearing shield contact surface can include a guide groove interacting with the carriage. Alternatively the guide groove can also be formed on the bearing shield, and the carriage can be formed on the housing. For example, a simple displacement of the bearing shield with respect to the housing could thus be made possible.

In some further exemplary embodiments the housing for the pinion bearing includes a separate pinion bearing seat. For example, the pinion bearing can be preinstalled in the pinion bearing seat. The pinion bearing seat with the preinstalled pinion bearing could then be attached to the housing. The assembly of the pinion bearing could thus be simplified. Furthermore, a manufacturing of the pinion bearing seat could also thereby be simplified.

Some exemplary embodiments relate to a bevel gear. The bevel gear comprises a housing according to at least one of the preceding exemplary embodiments. Furthermore, the bevel gear comprises a rotatably supported driveshaft. The driveshaft is configured in order to drive a redirection pinion of the bevel gear via a drive pinion. The redirection pinion could serve to redirect the rotational movement in another direction. Thus in some exemplary embodiments a bevel gear can be provided wherein the driveshaft is supported by a support bearing that can be aligned with a prepositioned driveshaft. Furthermore a bearing having a reduced or small bearing clearance could thus be chosen as the support bearing, even though the supporting is overdetermined here. The service life of the support bearing can thus possibly be increased.

In some further exemplary embodiments, the bevel gear is a differential. The redirection pinion can then be formed as a ring gear. Two output shafts can be driven by the ring gear, for example, via further transmission elements. The two output shafts can be separated in the axial direction by the ring gear. In some exemplary embodiments the output shafts can be driven at different rotational speeds.

Some exemplary embodiments relate to a method for assembling a bevel gear. In one procedure in the method, a support bearing is mounted on a driveshaft for rotatably supporting the driveshaft with respect to a housing. Furthermore, in a further procedure a pinion bearing is attached to the driveshaft and the housing. This takes place such that an axial orientation of the driveshaft with respect to the housing is determined. The support bearing is subsequently aligned with respect to the driveshaft. The support bearing is then fixed in the aligned position in the housing. While the use of the statically determinate pinion bearing in combination with the support bearing forms an overdetermined bearing assembly, in some exemplary embodiments it can thus be made possible that constraining forces which therefore act on the driveshaft can be kept as low as possible. As a result a bearing having a small bearing clearance could be used as the support bearing. For example, a more uniform loading of the support bearing could thus be made possible. It could be made possible that the rolling elements are uniformly loaded. This can possibly lead to a longer service life of the support bearing.

In some further exemplary embodiments of the method, the support bearing is used for aligning in a bearing shield. This bearing shield is positioned on the housing and attached thereto. Thus, for example, a simple aligning of the support bearing with respect to the driveshaft and attaching of the support bearing to the housing in the aligned position can be made possible. In other words, the support bearing can be attached to the housing only after the orienting of the driveshaft, so that it is aligned with the oriented driveshaft.

BRIEF DESCRIPTION OF THE DRAWINGS

Further advantageous embodiments are described in more detail below with reference to exemplary embodiments depicted in the drawings, but are not limited to said exemplary embodiments.

DETAILED DESCRIPTION

Figure 1:
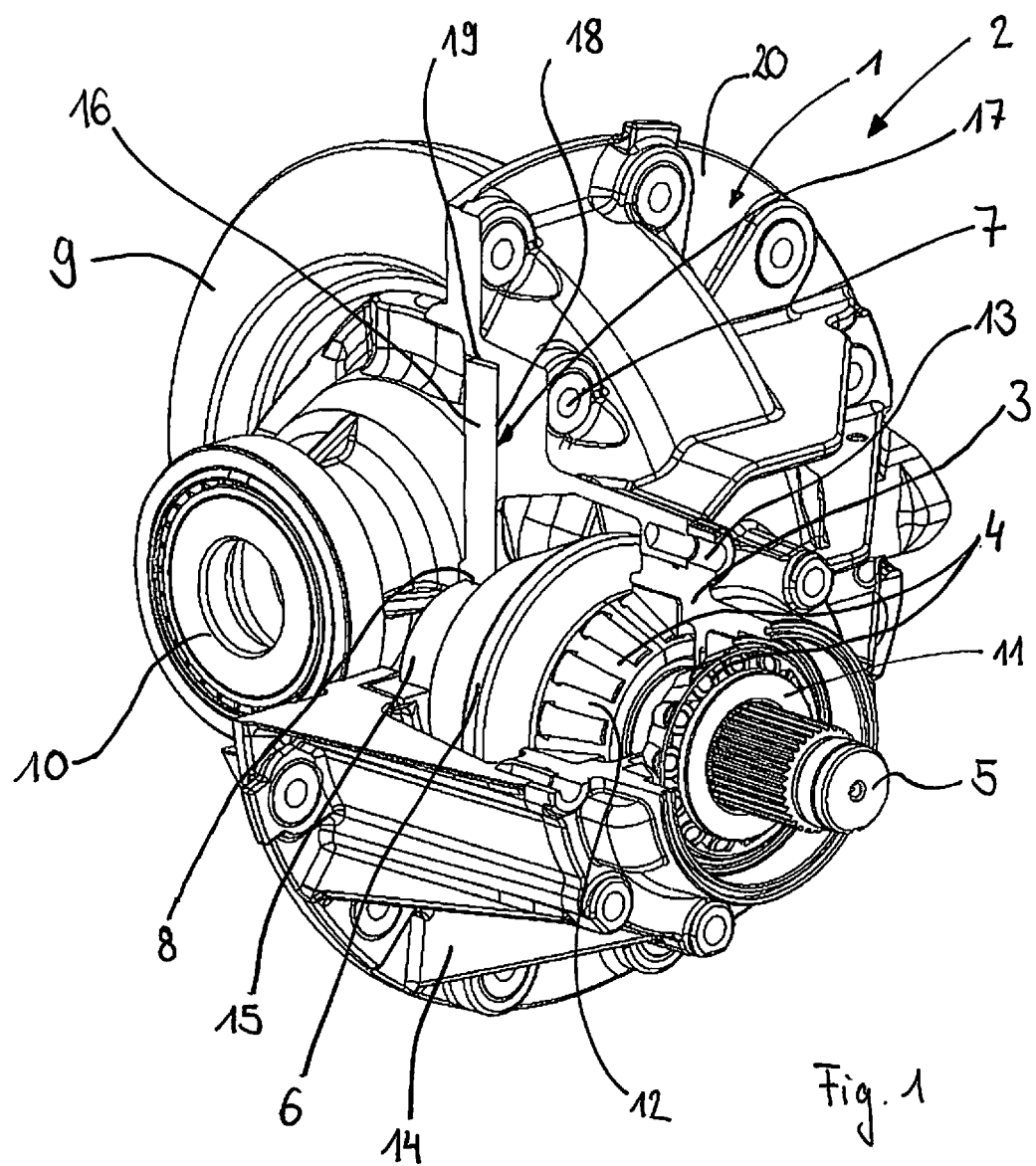
FIG. 1 shows a schematic depiction of a perspective, partially sectioned view of a differential having a housing according to an exemplary embodiment.

In the following description of the accompanying Figures, like reference numerals refer to like or comparable components. Furthermore, summarizing reference numerals are used for components and objects that appear multiple times in an exemplary embodiment or in an illustration, but that are described together in terms of one or more common features. Components or objects that are described with the same or summarizing reference numbers can be embodied identically, but also optionally differently, in terms of individual, multiple, or all features, their dimensions, for example, as long as the description does not explicitly or implicitly indicate otherwise.

FIG. 1 shows a schematic depiction of a perspective, partially sectioned view of a bevel gear, which is embodied as a differential, having a housing according to an exemplary embodiment.

As shown in FIG. 1, a housing 1 for a bevel gear 2 comprises a pinion bearing seat 3. The pinion bearing seat 3 is configured in order to support a pinion bearing 4 for a driveshaft 5 of a drive pinion 6. The housing 1 further comprises an attachment structure 7. The attachment structure 7 is configured to attach a support bearing seat 8 to the housing 1. Here the support bearing seat 8 is attached to the housing 1 such that a position of the support bearing seat 8 with respect to the pinion bearing seat 3 is variable in the radial direction.

The bevel gear 2 is a differential in the exemplary embodiment of FIG. 1. This differential comprises a ring gear (crown gear or crown wheel) 9. Not-shown output shafts can be driven via the ring gear 9. These not-shown output shafts are disposed vertically (perpendicularly) with respect to the driveshaft 5. One of the output shafts can be rotatably supported by a bearing 10. The other output shaft can be rotatably supported in a not-shown bearing which is disposed on the rear side of the ring gear 9 symmetric to the bearing 10.

The ring gear 9 meshes with the drive pinion 6. The drive pinion 6 is an axle bevel gear. The drive pinion 6 is rotated by a rotational movement of the driveshaft 5. For this purpose the driveshaft 5 is rotatably supported with respect to the housing 1 in the pinion bearing 4.

The pinion bearing 4 is a bearing assembly which itself is statically determinate. For this purpose the pinion bearing 4 comprises a first tapered roller bearing 11 and a second tapered roller bearing 12. In the exemplary embodiment of FIG. 1 the tapered roller bearing 12 acts as the outer main bearing, and the tapered roller bearing 11 acts as the inner main bearing. The tapered roller bearings 11 and 12 are preloaded against each other in an O-arrangement. For this purpose the pinion bearing 4 or the tapered roller bearing 11 and 12 are supported in the pinion bearing seat 3.

In further, not-shown exemplary embodiments, the pinion bearing can comprise any rolling-element bearing or any rolling-element bearing assembly.

The pinion bearing seat 3 is a separate housing component. This can be supported on a main part 14 of the housing 1 via a plurality of attachment bores 13, which are provided in the pinion bearing seat 3 and appropriately aligned in the housing 1. Here relatively large forces act on the pinion bearing 4.

In order to unload the pinion bearing 4, the driveshaft 5 does not end with an axial end of the drive pinion 6, but rather extends farther in the axial direction beyond the drive pinion 6 towards the ring gear 9. The driveshaft 5 thereby has a free axial end. The driveshaft 5 is rotatably supported in a support bearing 15 at this free axial end. The driveshaft 5 is thus rotatably supported in the support bearing 15 and in the statically determinate pinion bearing 4. This leads to an overdetermination of the supporting of the driveshaft 5. In the exemplary embodiment of FIG. 1 the support bearing 15 is a cylindrical roller bearing.

In further, not-shown exemplary embodiments, any type of bearing can be used as the support bearing. For example, a rolling-element bearing, ball bearing, roller bearing, etc. can be used as the support bearing.

The support bearing 15, or an outer ring of the support bearing 15, is supported in the support bearing seat 8. An inner ring of the support bearing 15 is attached to the shaft. The support bearing seat 8 is formed in a bearing shield 16. Therefore, the bearing shield 16 supports the support bearing 15.

The bearing shield 16 is a component that is separate from the housing 1. The bearing shield 16 can be positioned with respect to the housing 1 and thus also with respect to the pinion bearing seat 3. The bearing shield 16 itself is designed without a centering. The bearing shield 16 is attached to the housing 1 via the attachment structure 7.

In the exemplary embodiment of FIG. 1 the attachment structure 7 is an opening in the housing 1. The bearing shield 16 can optionally include a counter-attachment structure via which the bearing shield 16 can be attached to the housing 1 and to its attachment structure 7. For example, the bearing shield 16 has a slot via which the housing 1 can be attached to the housing 1 at the opening or the attachment structure 7 using a screw connection. For example, the opening of the attachment structure 7 can include a thread for this purpose.

In further, not-shown exemplary embodiments the bearing shield can be attached to the housing using all possible other attachment mechanisms. For this purpose the bearing shield or the housing can include a carriage- or rail-structure, for example.

For example, the attachment structure 7 can make possible a positioning of the bearing shield 16, and thus also of the support bearing seat 8, in a radial direction of the driveshaft 5, in an axial direction of the driveshaft 5, and in a positioning at an angle with respect to the axial direction of the driveshaft 5.

The housing 1 further has a bearing shield contact surface 17. In an analogous manner the bearing shield 16 has a guide surface 18. In an assembled state the guide surface 18 of the bearing shield 16 abuts on the bearing shield contact surface 17. The bearing shield contact surface 17 and the guide surface 18 can be configured, for example, such that a prepositioning of the bearing shield 16 on the housing is made possible. After the prepositioning, the two surfaces 17 and 18 can still allow the fine alignment in accordance with the orientation of the driveshaft 5.

In the exemplary embodiment of FIG. 1 the housing 1 further includes a stop 19. This stop serves as the limit for the bearing shield 16 in the radial direction. A prepositioning of the bearing shield 16 can thus be made possible. The bearing shield 16 is disposed in a radially inner-lying region of the housing 1.

The housing 1 also comprises an attachment flange 20. The attachment flange 20 is disposed in a radially outer region of the housing 1. The attachment flange 20 includes a plurality of attachment bores. These can serve, for example, to connect the bearing to a further bearing half. In the installed state, in the axial direction the bearing shield 16 is disposed substantially in a region of an attachment flange 20 of the housing 1. A simple manufacturing, for example, of the housing 1 with the bearing shield 16 can thus be made possible.

In other words, the housing 1 comprises a separate component. This is the bearing shield 16. The bearing shield 16 supports the support bearing 15. The bearing shield 16 or the separate component can be designed without a centering. This means that the bearing shield 16 can be substantially freely positioned, within certain limits, with respect to the housing 1 and then attached to the housing 1. In some cases a separate screw fastening or attachment is thus required. After the mounting of the driveshaft 5 and the pinion bearing 4, this separate screw fastening is tightened in a final assembly procedure. In some exemplary embodiments it can thus be achieved, for example, that the positioning of the support bearing seat 8 is achieved due to the preloaded bearing or the pinion bearing 4. It could thus be avoided, or the risk could be reduced, for example, that stresses occur in the bearing.

Figure 2:
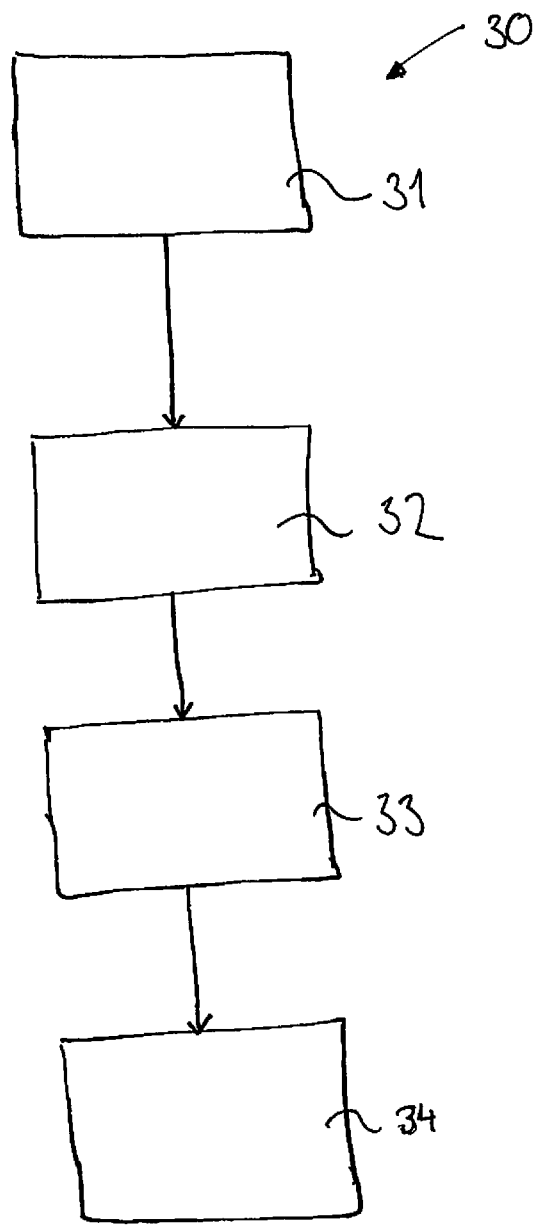
FIG. 2 shows a flow diagram of a method for assembling a bevel gear according to an exemplary embodiment.

FIG. 2 shows a flow diagram of a method for assembling a bevel gear according to an exemplary embodiment.

As shown in FIG. 2, a method 30 for assembling a bevel gear comprises a plurality of procedures. In one procedure 31 a support bearing is mounted on a driveshaft. Here the support bearing is mounted on the driveshaft such that the driveshaft is rotatably supported with respect to a housing. In a further procedure 32, a pinion bearing is attached to the driveshaft and to the housing. Here an axial orientation of the driveshaft relative to the housing is determined. In a subsequent procedure 33 the support bearing is aligned with respect to the driveshaft. Subsequently the support bearing is attached to the housing in the aligned position as procedure 34.

The bevel gear can also be a differential. Expressed in other words, the driveshaft 5 is first oriented via the main bearing assembly or the pinion bearing 4. The support bearing 15 is subsequently aligned on the driveshaft 5 and attached to the housing 1 according to the alignment. In some cases it can therefore be made possible that the bearing clearance of the support bearing 15 can be reduced in an installed state. The reduction of the bearing clearance could be expedient since a more precise positioning of the support bearing 15 could thereby again be made possible. The reduction of the bearing clearance could be possible since the tension or forces that act on the support bearing 15 can be reduced. In some exemplary embodiments, more rolling elements could thus be used for supporting the forces in the support bearing 15. Thus, for example, the service life of the support bearing 15 could be increased. Furthermore, since more rolling elements are in use in the support bearing 15, a greater force could be supported by the support bearing 15.

Since more force can be supported by the support bearing 15, in some exemplary embodiments the load bearing capacity of the main bearing or of the pinion bearing 4 can possibly be reduced. Thus a reduction of friction can be effected in the pinion bearing 4. Additionally or alternatively, in these cases even the preload of the main bearing or of the pinion bearing 4 could possibly be reduced. A further friction reduction could thereby be made possible. For example, the bearing friction could be further reduced. Thus a compromise between the reduction of the number of rollers, a loading pattern optimization, and a reduction of the preload could possibly be improved.

A housing according to at least one of the exemplary embodiments described can be used, for example, not only for supporting a differential, but also for any other bevel gear. For example, a housing or a bevel gear or differential according to at least one of the exemplary embodiments can be used in vehicles of any type, for example trucks or automobiles. Expressed in other words, exemplary embodiments relate to the optimized installation of the support bearing ring in a differential or in another bevel gear.

The exemplary embodiments and their individual features disclosed in the above description, the following claims, and the accompanying Figures can be meaningful and implemented both individually and in any combination for the realization of an exemplary embodiment in its various designs.

Representative, non-limiting examples of the present invention were described above in detail with reference to the attached drawings. This detailed description is merely intended to teach a person of skill in the art further details for practicing preferred aspects of the present teachings and is not intended to limit the scope of the invention.

Moreover, combinations of features and steps disclosed in the above detailed description may not be necessary to practice the invention in the broadest sense, and are instead taught merely to particularly describe representative examples of the invention. Furthermore, various features of the above-described representative examples, as well as the various independent and dependent claims below, may be combined in ways that are not specifically and explicitly enumerated in order to provide additional useful embodiments of the present teachings.

All features disclosed in the description and/or the claims are intended to be disclosed separately and independently from each other for the purpose of original written disclosure, as well as for the purpose of restricting the claimed subject matter, independent of the compositions of the features in the embodiments and/or the claims. In addition, all value ranges or indications of groups of entities are intended to disclose every possible intermediate value or intermediate entity for the purpose of original written disclosure, as well as for the purpose of restricting the claimed subject matter.

REFERENCE NUMBER LIST

1 Housing
2 Bevel gear
3 Pinion bearing seat
4 Pinion bearing
5 Driveshaft
6 Drive pinion
7 Attachment structure
8 Support bearing seat
9 Ring gear
10 Bearing
11 Tapered roller bearing
12 Tapered roller bearing
13 Attachment bore
14 Main housing part
15 Support bearing
16 Bearing shield
17 Bearing shield contact surface
18 Guide surface
19 Stop
20 Attachment flange
30 Method
31 Mounting
32 Attaching
33 Aligning
34 Attaching

We claim:

1. A housing for a bevel gear, comprising:
a pinion bearing seat configured to support a pinion bearing for a driveshaft having a drive pinion; and
an attachment structure configured to attach a support bearing seat to the housing such that the position of the support bearing seat with respect to the pinion bearing seat is variable in a radial direction of the driveshaft such that the support bearing seat can be detachably secured to the housing at various radial positions.

2. The housing according to claim 1, comprising the support bearing seat which is configured to support a support bearing disposed at an axial end of the driveshaft.

3. The housing according to claim 2, wherein the attachment structure is configured to vary an angle formed by an axial direction of the support bearing seat and an axial direction of the pinion bearing seat and/or adjust a position of the support bearing seat in the axial direction with respect to the pinion bearing seat.

4. The housing according to claim 3, wherein the attachment structure attaches a bearing shield to the housing and the support bearing seat is provided on the bearing shield.

5. The housing according to claim 4, further comprising a counter-attachment structure formed on the bearing shield and configured to adjustably attach the bearing shield to the housing using the attachment structure.

6. The housing according to claim 5, wherein the bearing shield is disposed in a radially inner-lying region of the housing.

7. The housing according to claim 6, wherein the bearing shield has a guide surface configured to abut on a bearing shield contact surface of the housing.

8. A bevel gear, comprising:
the housing according to claim 7;
the pinion bearing supported in the pinion bearing seat;
the driveshaft rotatably supported by the pinion bearing and configured to drive the drive pinion and
a driven gear meshing with the drive pinion in a bevel gear arrangement.

9. The housing according to claim 1, wherein the attachment structure is configured to: (i) vary an angle formed by an axial direction of the support bearing seat and an axial direction of the pinion bearing seat and/or (ii) adjust a position of the support bearing seat in the axial direction with respect to the pinion bearing seat.

10. The housing according to claim 1, wherein the attachment structure attaches a bearing shield to the housing and the support bearing seat is provided on the bearing shield.

11. The housing according to claim 10, further comprising a counter-attachment structure formed on the bearing shield and configured to adjustably attach the bearing shield to the housing using the attachment structure.

12. The housing according to claim 10, wherein the bearing shield is disposed in a radially inner-lying region of the housing.

13. The housing according to claim 10, wherein the bearing shield has a guide surface configured to abut on a bearing shield contact surface of the housing.

14. A bevel gear, comprising:
a housing,
a driveshaft having a drive pinion disposed between first and second ends of a cylindrical shaft,
a pinion bearing rotatably supporting a first cylindrical portion of the driveshaft between the first end and the drive pinion, the pinion bearing being supported in a pinion bearing seat provided on the housing,
a support bearing rotatably supporting a second cylindrical portion of the driveshaft between the second end and the drive pinion, the support bearing being supported in a support bearing seat, and
a bearing shield configured to affix the support bearing seat to the housing such that the position of the support bearing seat relative to the pinion bearing seat is variable in a radial direction of the driveshaft such that the support bearing seat can be detachably secured to the housing at various radial positions, and
a crown gear meshing with the drive pinion.

15. The bevel gear according to claim 14, wherein the pinion bearing comprises first and second tapered roller bearings that are preloaded against each other in an O-arrangement.

16. The bevel gear according to claim 15, wherein the support bearing is a cylindrical roller bearing.

17. The bevel gear according to claim 16, wherein the bearing shield is formed as a flange that is completely separable from the housing and an outer ring of the cylindrical roller bearing is installed in the flange.

* * * * *